US012793875B2

(12) United States Patent
Foucaut

(10) Patent No.: US 12,793,875 B2
(45) Date of Patent: Nov. 10, 2026

(54) ELECTROMAGNETIC ACTUATOR WITH DIRECT DRIVE AND IMPROVED SHOCK ABSORBANCE

(71) Applicant: Moving Magnet Technologies, Besançon (FR)

(72) Inventor: Antoine Foucaut, Montarlot les Rioz (FR)

(73) Assignee: Moving Magnet Technologies, Besançon (FR)

( * ) Notice: Subject to any disclaimer, the term of this patent is extended or adjusted under 35 U.S.C. 154(b) by 61 days.

(21) Appl. No.: 18/688,949

(22) PCT Filed: Sep. 6, 2022

(86) PCT No.: PCT/FR2022/051684
§ 371 (c)(1),
(2) Date: Mar. 4, 2024

(87) PCT Pub. No.: WO2023/031572
PCT Pub. Date: Mar. 9, 2023

(65) Prior Publication Data

US 2024/0242869 A1 Jul. 18, 2024

(30) Foreign Application Priority Data

Sep. 6, 2021 (FR) ........................................ 2109286

(51) Int. Cl.
*H01F 7/08* (2006.01)
*H01F 7/16* (2006.01)

(52) U.S. Cl.
CPC ............... *H01F 7/081* (2013.01); *H01F 7/16* (2013.01)

(58) Field of Classification Search
CPC ........ H01F 7/081; H01F 7/16; F16K 31/0644; F16K 31/0689; F16K 27/029; F16K 31/0696
See application file for complete search history.

(56) References Cited

U.S. PATENT DOCUMENTS

2018/0116418 A1 5/2018 Shakal et al.
2019/0049037 A1 2/2019 Lee

FOREIGN PATENT DOCUMENTS

DE 102011078102 A1 12/2012
EP 1897211 B1 12/2020

(Continued)

OTHER PUBLICATIONS

French Search Report for Application No. 2109286dated May 25, 2022, 2 pages.

(Continued)

*Primary Examiner* — Mohamad A Musleh
(74) *Attorney, Agent, or Firm* — TraskBritt

(57) ABSTRACT

A direct drive electromagnetic actuator includes a housing and a movable body extended by an actuating head. A resilient member exerts a force on the movable body toward an inoperative position. A coil interacts with the movable body so as to generate a second force on the movable body toward an operative position. The actuator further includes a shock-absorbing block movable with respect to the housing over at least a portion of the travel of the movable body and joined to the resilient member. The shock-absorbing block is compressed when the movable body is in the operative position. The actuator also includes a rigid abutment movable over at least a portion of the travel of the movable body between the inoperative position and the (Continued)

operative position, the rigid abutment coming into contact with a wall secured to the housing when the movable body is in the operative position.

16 Claims, 6 Drawing Sheets

(56) References Cited

FOREIGN PATENT DOCUMENTS

| | | | | | |
|---|---|---|---|---|---|
| JP | 2003-343754 | A | | 12/2003 | |
| KR | 20080082822 | A | * | 9/2008 | ............... H01F 7/16 |
| KR | 101094211 | B1 | * | 12/2011 | ............ H01F 7/088 |
| WO | 2016/096256 | A1 | | 6/2016 | |

OTHER PUBLICATIONS

International Search Report for Application No. PCT/FR2022/051684 dated Dec. 20, 2022, 2 pages.
International Written Opinion for Application No. PCT/FR2022/051684 dated Dec. 20, 2022, 4 pages.
Japanese Notice of Reasons for Refusal for Application No. 2024-514675 dated Jun. 23, 2026, 6 pages.

* cited by examiner

ELECTROMAGNETIC ACTUATOR WITH DIRECT DRIVE AND IMPROVED SHOCK ABSORBANCE

CROSS REFERENCE TO RELATED APPLICATIONS

This application is a national phase entry under 35 U.S.C. § 371 of International Patent Application PCT/FR2022/051684, filed Sep. 6, 2022, designating the United States of America and published as International Patent Publication WO 2023/031572 A1 on Mar. 9, 2023, which claims the benefit under Article 8 of the Patent Cooperation Treaty to French Patent Application Serial No. FR2109286, filed Sep. 6, 2021.

TECHNICAL FIELD

The present disclosure relates to the field of direct drive actuators for control, mainly on/off, of a coupled member, especially a diaphragm of a valve body for fluid or microfluid applications used for fluid flow control.

BACKGROUND

The principle of direct drive actuators is well known in fluid flow control, wherein a port or an opening in a fluid flow path must be opened or closed by means of a closing element such as a seal, a membrane or a diaphragm, controlled by an electric current.

Such actuators commonly comprise a magnetic circuit wound about a flux-generating coil, with a piston made of magnetic material moving under the influence of the flux in the magnetic circuit, in response to the passage of the current through the coil. The piston is mechanically coupled to the closing means that opens or closes the opening or port in the fluid flow path when the piston moves inside the magnetic circuit.

Generally, the valve is closed when the electromagnet is powered off, and open when the electromagnet is powered on.

Such actuators may incorporate one or more compression springs, to provide an axial force, along the main axis of the piston, additional to that which would be exerted on the piston by the actuator alone, to aid with opening or closing the opening or port and/or for biasing the valve into an open or closed position.

U.S. Patent Application Publication No. US 2018/116418 A1 is known in the state of the art, describing a valve that may comprise a solenoid coil, a piston comprising a core configured to react to a magnetic field generated by the solenoid coil, and a valve disc. The valve disc may be positioned at a foremost portion of the core and configured to absorb an impact when the valve is closed. A projection can be positioned and configured to absorb an impact when the valve is open. The valve can be used in an air mattress system in fluid communication between an air pump and an inflatable air chamber of a mattress.

Also known is International Patent Application Publication No. WO2016096256, describing a system of valves comprising a main valve and a pilot valve that comprises a closing element that can be actuated by a rotor to connect a first pressure connection of the system of valves to a second pressure connection of the system of valves. At one end opposite the closing element of the pilot valve, the rotor is subjected to the action of a rotor spring system that is tensioned between a polar tube and the rotor. The invention aims to create a system of valves that has a simple design and is inexpensive to manufacture. To this end, the rotor spring system represents at least two portions of the travel of the rotor, which exhibit different degrees of resilient stiffness.

Also known is U.S. Patent Application Publication No. US 2019/0049037 A1, describing a solenoid valve for controlling a flow rate of a flow path connecting a first port to a second port, the solenoid valve comprising: a valve housing installed in a modulator block; an armature arranged inside the valve housing and reciprocating in an axial direction thereof to adjust a flow rate of a working fluid; and a first resilient element having a shock-absorbing portion, which is inserted between the magnetic core and the armature, and provides the armature with a resilient force in a direction opposite to a driving force of the magnetic core.

The problem posed by the solutions of the prior art and especially by U.S. Patent Application Publication No. US 2018/116418 A1 is that the position of the plunger is not defined very precisely in the open position. The position of the plunger depends on the wear of the abutment, the resilience of the shock absorber (bumper); this has the effect of not allowing an opening of the valve controlled by the plunger and the flow rate of the valve equipped with such an actuator is not constant. This poses problems of precision and of constancy of the flow rate of a valve controlled by such an actuator.

BRIEF SUMMARY

In order to address this drawback, the present disclosure relates, in its most general sense, to a direct drive electromagnetic actuator that includes an outer housing and a movable body extended by an actuating head, movement of which between an inoperative position and an operative position can be controlled by the actuator. A resilient means is arranged between the movable body and a wall secured to the housing. The movable body further includes a ferromagnetic material. A fixed coil is configured to generate a force acting on the movable body in the opposite direction to that resulting from the action of the resilient means on the movable body. The fixed coil is configured to move the movable body into the operative position when it is powered. The actuator further comprising a shock-absorbing block that is movable with respect to the housing over at least a portion of the travel of the movable body. The resilient means is joined to the shock-absorbing block. The length of the shock-absorbing block is determined so that the shock-absorbing block is compressed when the movable body is in the operative position. The actuator further comprises a rigid abutment that is movable over at least a portion of the travel of the movable body and comes into contact with the wall secured to the housing when the movable body is in the operative position.

BRIEF DESCRIPTION OF THE DRAWINGS

Other features and advantages will become apparent from the following description of embodiments of the present disclosure, given only by way of example, referring to the accompanying drawings, in which.

DETAILED DESCRIPTION

First Variant Embodiment

Figure 1:
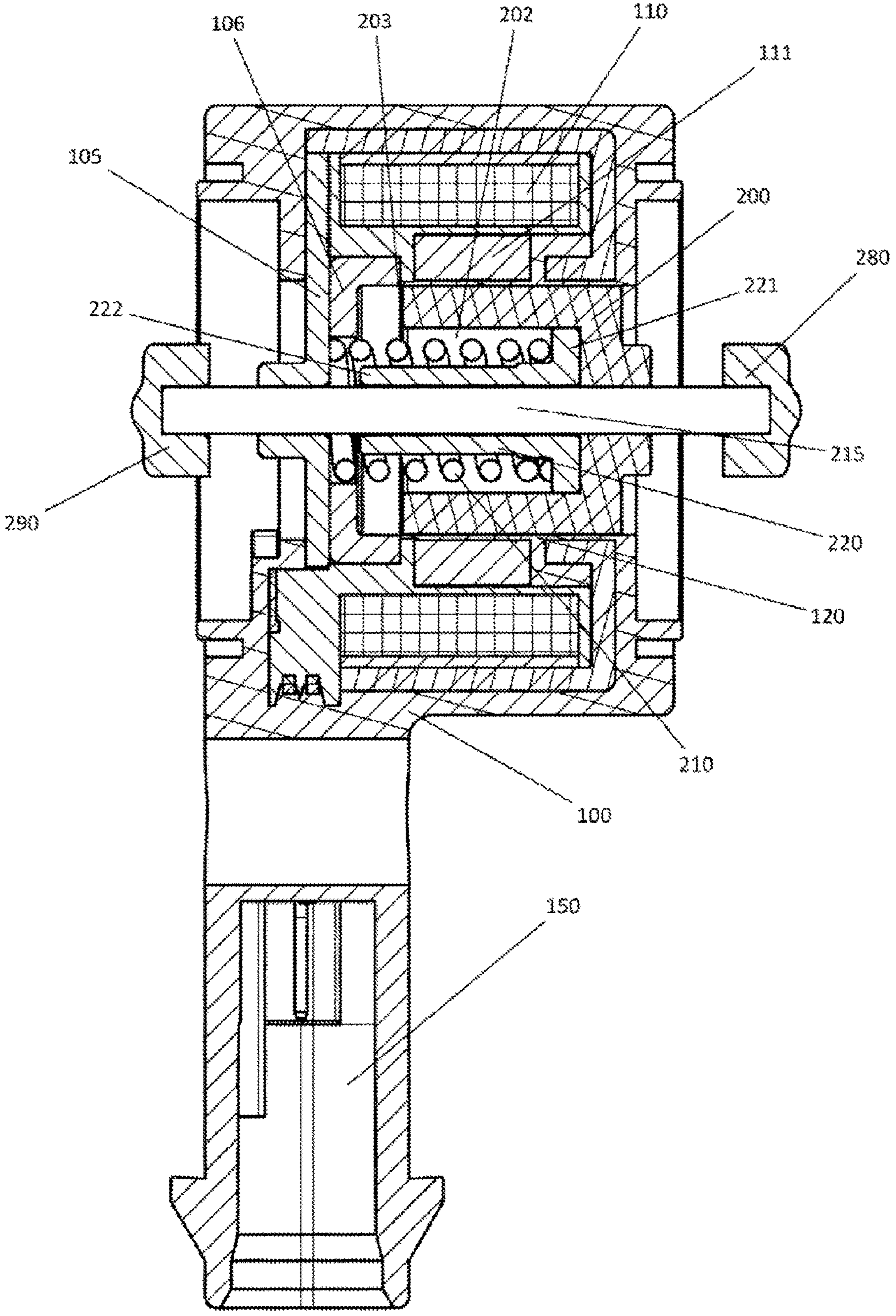
FIG. 1 depicts a cross-sectional view of a first variant embodiment of an actuator according to the present disclosure.

FIG. 1 depicts a first variant embodiment of a linear actuator according to the present disclosure. It consists of a rigid housing (100) extended by a connector (150). A coil (110) controls the movement of a movable body (200) between two extreme positions, the movable body (200) driving an actuating head (280), which can be coupled to a member to be controlled, via a pin (215). A magnet (111) is provided between the coil (110) and the movable body (200) so as to increase the force of the actuator for a given bulk and a fixed supply current of the coil (110). Nevertheless, a person skilled in the art could dispense with this costly magnet in the context of specifications that are less restrictive. The movable body (200) is guided by a sleeve (120) of complementary cross section.

The movable body (200) has a tubular shape, and a cylindrical recess (202) in which a resilient return means (210) is positioned, pushing the movable body (200) toward the actuating head (280). Thus, when inoperative and when the coil (110) is not powered on, the actuating head (280) is in one of the extreme positions, in this case in the deployed position, which is also referred to as inoperative position. The application of an electric current in the coil causes the movable body (200) to move in the opposite direction, by counteracting the force exerted by the resilient return means (210) to drive the actuating head (280), until the other extreme position if the electric current passing through the coil is sufficient, or in the retracted or operative position. Interrupting the power supply of the coil (110) causes the actuating head (280) to return to its inoperative, or deployed, position.

A shock-absorbing block (220) is also positioned in the cylindrical recess (202) of the movable body (200). It is coaxial with the resilient return means (210) and has a connected end (221) formed by a flared collar, located on the side of the actuating head (280), bearing against the bottom of the cylindrical recess (202) and therefore is connected to one of the ends of the resilient return means (210). The other end (222) of the shock-absorbing block (220) bears against an abutment, herein the front wall (105) of a flange secured to the rigid housing (100), also serving to guide the movable body (200) via the pin (215).

When the coil (110) is powered, it attracts the movable body (200) into the operative position, with a force that counters the force applied by the resilient return means (210). The shock-absorbing block (220), the unconnected end (222) of which is free and separated from the wall (105) when at rest, comes into contact with the wall (105) and then deforms by compression at the end-of-travel, which avoids unwanted noises and vibrations. The retracted end-of-travel position is obtained by placing a rigid abutment (203) of the movable body (200) in contact with a cup (106).

The actuator presented in FIG. 1 incorporates a configuration wherein, according to a preferred embodiment, the actuating head (280) is driven into the inoperative position when the coil (110) is not powered. However, it is obvious for a person skilled in the art, depending on the application, to place an actuating head (290) on the opposite side, having a retracted position when the coil is not powered, either as a replacement for or in addition to the actuating head (280).

Second Variant Embodiment

Figure 2:
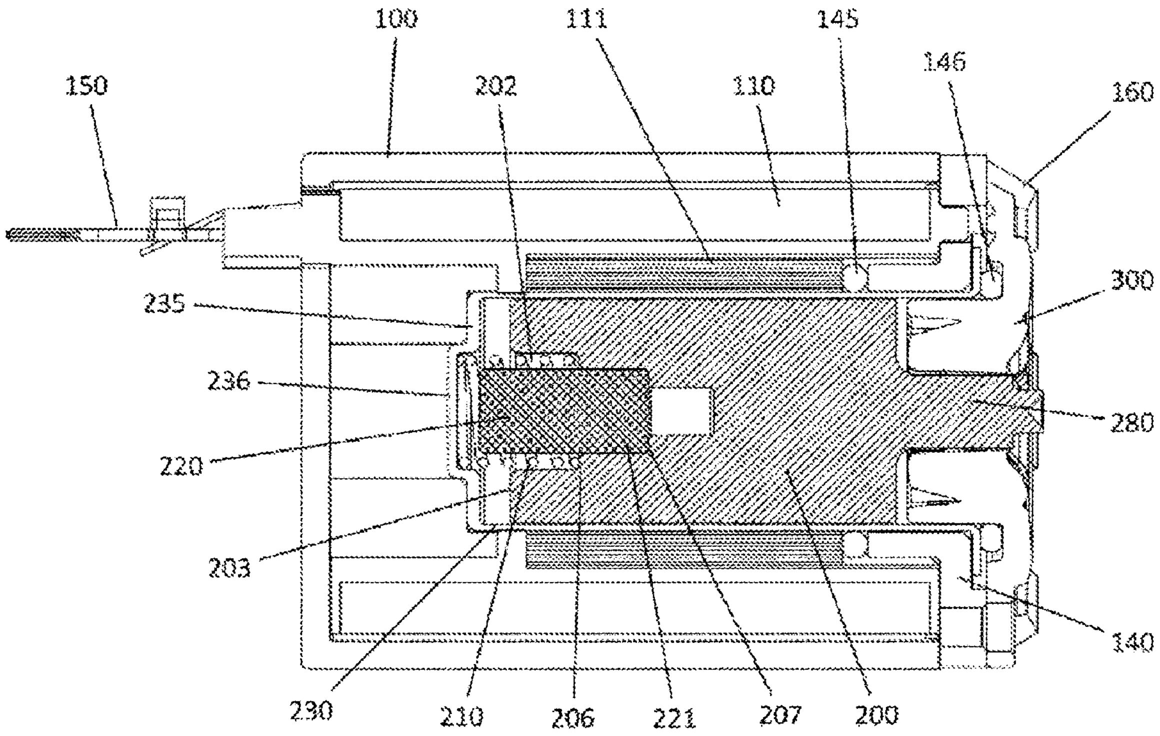
FIG. 2 depicts a cross-sectional view of a second variant embodiment of an actuator according to the present disclosure.

FIG. 2 depicts a variant embodiment of a linear actuator intended for a diaphragm valve (300) application. The actuating head (280) extending the movable body (200) controls the movement of the membrane (not shown) between, on the one hand, an inoperative position, in which it is pushed by resilient return means (210) consisting of a spring, sealing the fluid supply ducts and, on the other hand, an operative position controlled by powering the electrical coil (110), wherein the membrane releases the flow of fluid in the valve (300).

The movable body (200) is guided by a tubular sleeve (230), for example, made of steel, and has a cylindrical recess (202), opening onto the front face opposite the actuating head (280), and making it possible to accommodate the resilient return means (210). The cylindrical recess (202) of the movable body (200) has a section larger than the section of the spring of the resilient return means (210), when the latter is in the compressed position, in order to avoid any friction between the spring and the periphery of the cylindrical recess (202). On the side of the actuating head (280), this recess is extended by a second segment of smaller section. The movable body (200) thus has an annular shoulder (206) forming an abutment for the spring. The other end of the spring of the resilient return means (210) abuts in a recess (236) of the housing, herein made in the front wall (235) of the tubular sleeve (230).

The second section forms, on the side of the actuating head (280), a second shoulder (207). The shock-absorbing block (220) is engaged in this second section of the cylindrical recess (202) and abuts against this second shoulder (207). It is thus connected to the second end of the resilient return means (210), both being rigidly attached to the movable body (200), the connected end presented in the preceding figure is herein the surface of the shock-absorbing block (220) bearing against the shoulder (207) of the movable body (200). The length of the shock-absorbing block (220) is determined so that, when the movable body (200) is in the operative (or retracted) position, it is compressed. In the example described, the length of the shock-absorbing block (220) is determined so that the unconnected end does not come into contact with the wall (235) of the tubular sleeve (230) when the movable body (200) is in the inoperative (or deployed) position. The energy needed to exit the "inoperative" mode is thus reduced, and the shock-absorbing effect occurs at the end of the disengagement travel. The operative position, at the end of the disengagement travel, is obtained by placing the movable body (200) abutting against the wall (235) of the tubular sleeve (230), by cooperation of rigid materials, to obtain a precise abutment position. The length of the shock-absorbing block (220) is therefore also the result of a compromise between the desired shock absorption and the current needed to reach the operative, or retracted, position.

In the example described, a collar (140) ensures the assembly and the alignment of the elements that make up the electromagnetic actuator by forceful engagement in the housing (100). The front edge (160) of the housing (100) is folded to ensure the holding and alignment of the valve body (300). Annular joints (145, 146) ensure the sealing of the actuator and the alignment of the magnet (111).

Third Variant Embodiment

Figure 3A:
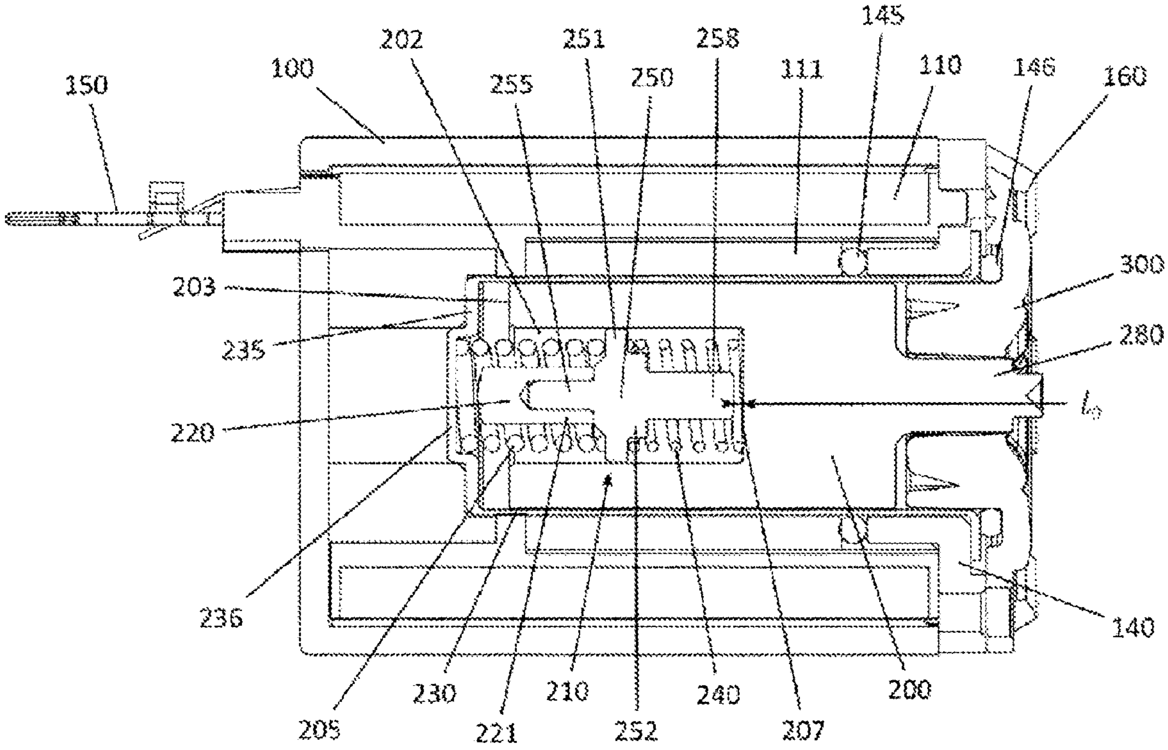
FIGS. 3A-3C depict a cross sectional view of a third variant embodiment of an actuator according to the present disclosure, illustrating different positions of the movable body.
Figure 3B:
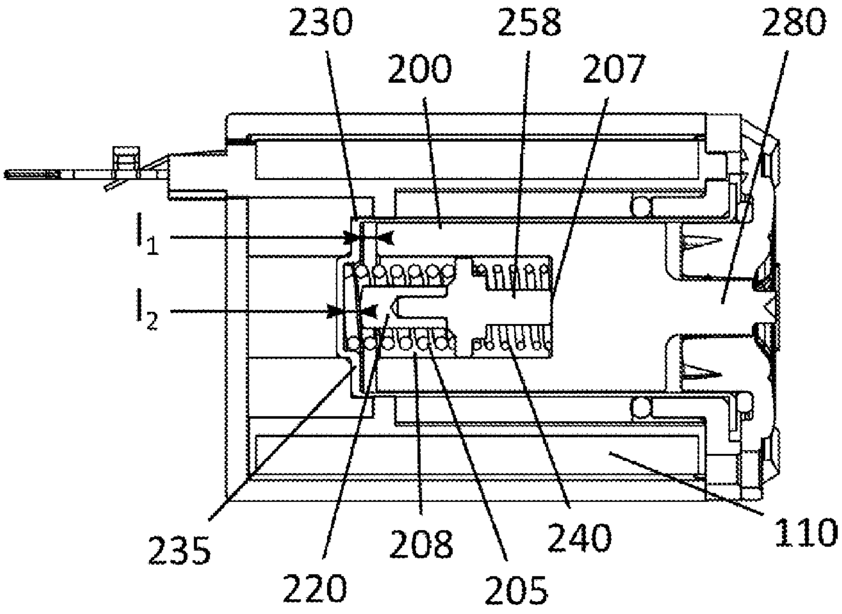
Figure 3C:
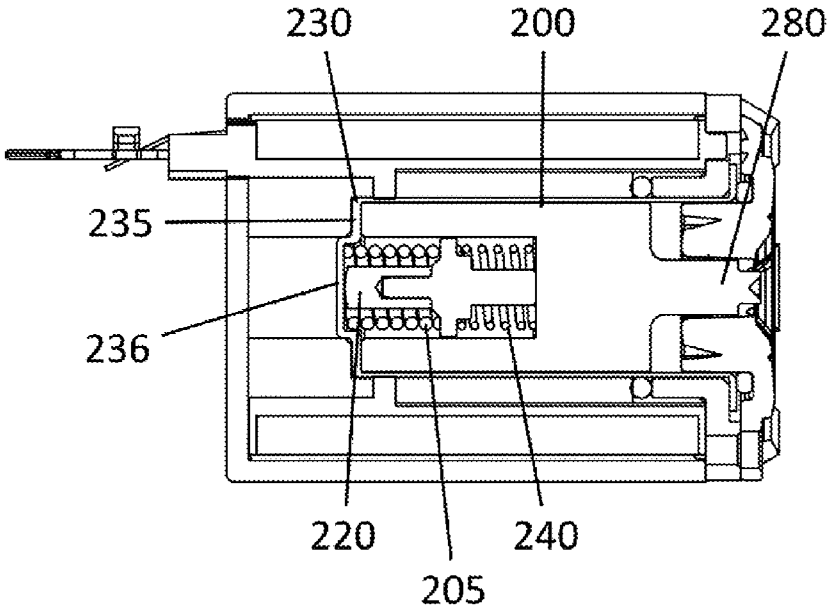

FIGS. 3A-3C depict a third variant embodiment of a linear actuator also intended for a valve application. According to this variant, the resilient return means (210) consists of a juxtaposition of two coaxial springs (205, 240) coupled in series by an insert (250). The stiffness of the spring (205), bearing in a recess (236) of the front wall (235) of the tubular sleeve (230), is greater than the stiffness of the adjacent spring (240), bearing on the bottom (207) of the cylindrical recess (202) of the movable body (200).

This insert (250) has a median annular shoulder (251) of which the cross section matches the inner section of the cylindrical recess (202) of the movable body (200) to allow longitudinal movement. The annular surface of the median annular shoulder (251), directed on the side opposite the actuating head (280), forms a bearing abutment for the front end of the spring (205), the opposite end of which bears in a recess (236) of the wall (235) of the tubular sleeve (230). The annular surface directed on the opposite side forms an annular bearing surface of the second spring (240), the second end of which abuts against the bottom of the cylindrical recess (202) of the movable body (200). The insert (250) has a cylindrical extension (252) having an outer section matching the inner section of the first coil of the spring (240) in order to ensure the positioning and the guidance of the spring (240).

The insert (250) has a second cylindrical extension (258) expanding axially inside the low-stiffness spring (240) and the cross section of which is less than the cross section of the spring (240). This second cylindrical extension (258) can bear axially on the bottom of the cylindrical recess (202) so as to limit the compression of the low-stiffness spring (240). FIG. 3A shows the movable body (200) in the deployed position, when the coil is not powered, and shows the maximum compression travel, $l_0$, of the low-stiffness spring (240).

The shock-absorbing block (220) is engaged on an axial stud (255) extending the median annular shoulder (251) of the insert (250). It is arranged coaxially inside the spring (205) and has a length less than that of the spring (205) in order to only come into contact with the wall (235) of the tubular sleeve (230) after the movable body (200) has started to move in the disengagement direction and so as to be compressed in the operative position.

FIG. 3B shows the same variant of an actuator following a movement $l_0$ of the movable body by powering the coil (110). The second cylindrical extension (258) is then in contact with the bottom of the cylindrical recess (202) of the movable body (200), this position corresponding to the maximum compression of the low-stiffness spring (240), the remainder of the travel until reaching the operative position having a joint movement of the movable body (200) and the insert (250). As mentioned in the preceding paragraph, it can be noted in FIG. 2 that the distance $l_1$ separating the wall (235) of the tubular sleeve (230) and the rigid abutment (203) of the movable body (200) is greater than the distance $l_2$ separating the wall (235) of the tubular sleeve (230) and the front end of the shock-absorbing block (220) so as to ensure a compression of the shock-absorbing block (220) at the end-of-travel in order to dissipate the kinetic energy of the movable body in the shock-absorbing block (220) rather than in the tubular sleeve (230), thus making it possible to limit the vibrations and consequently the noise caused by actuation in the retracted position. The final operative position, depicted in FIG. 3C, is obtained when the rigid abutment (203) of the movable body (200) is in contact with the recess (236) of the wall (235) of the tubular sleeve (230), or when the distance/i is zero.

Fourth Variant Embodiment

Figure 4A:
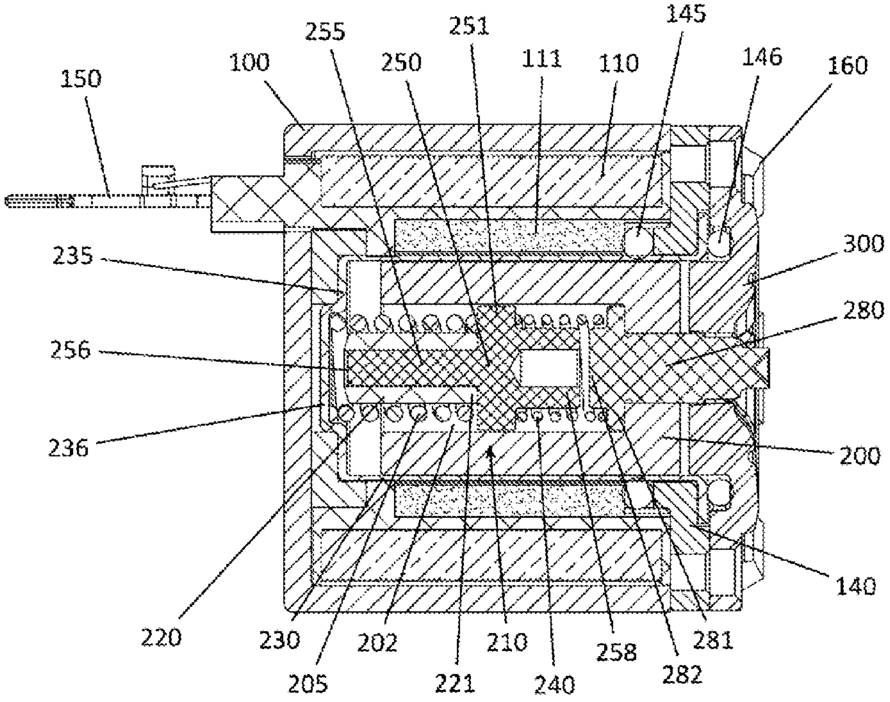
FIGS. 4A-4D depict a cross-sectional view of a fourth variant embodiment of an actuator according to the present disclosure, illustrating different positions of the movable body.
Figure 4B:
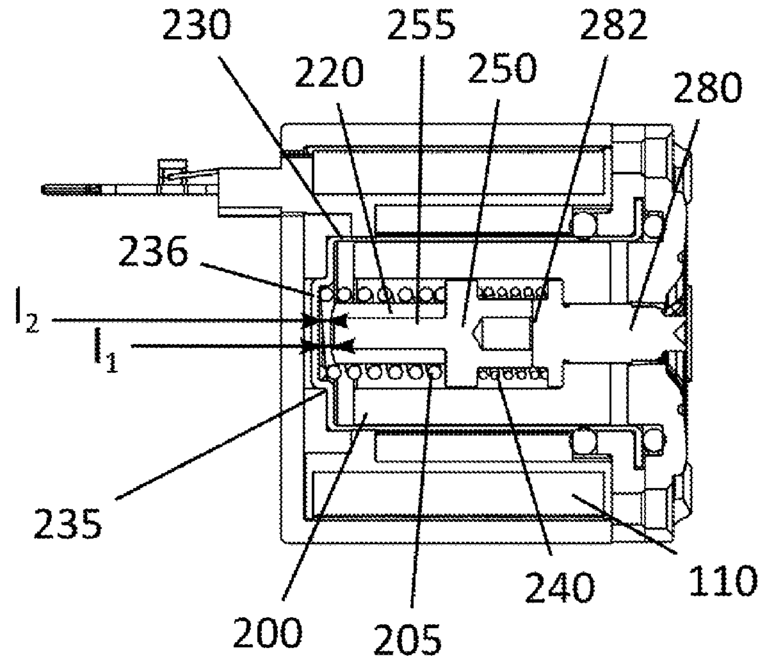
Figure 4C:
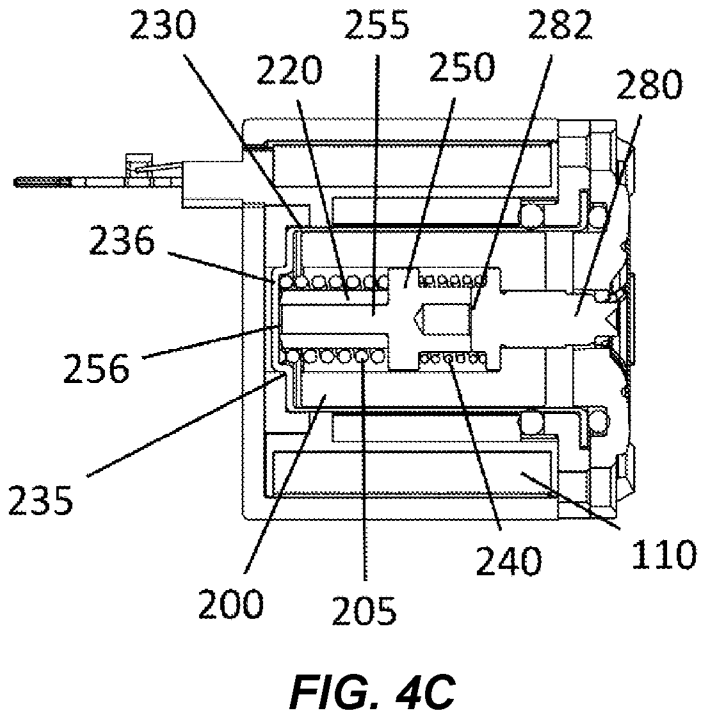
Figure 4D:
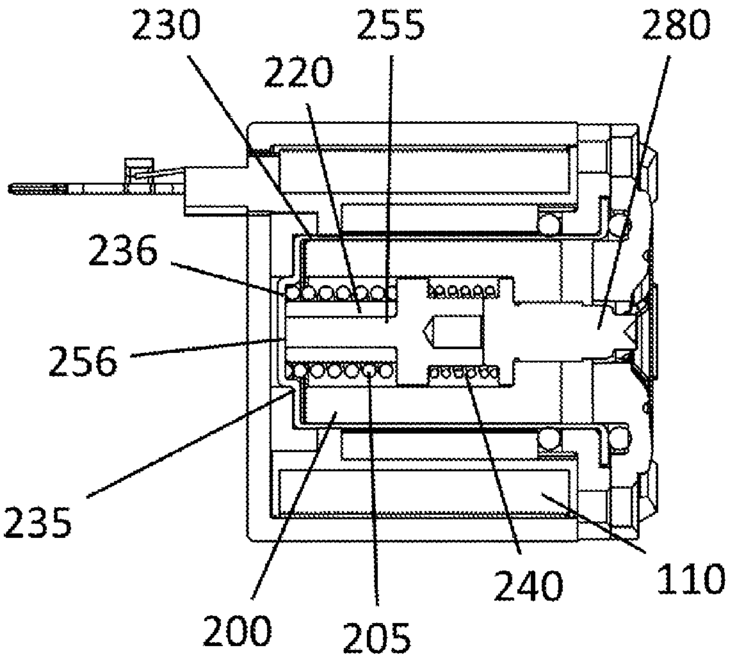

FIGS. 4A-4D depict a fourth variant embodiment of a linear actuator according to the present disclosure. FIG. 4A shows the actuating head (280) of the actuator in the inoperative position, when the coil (110) is not powered and the springs (205, 240) are fully extended. FIG. 4B shows an intermediate situation of the movement travel of the movable body (200), following the powering of the coil (110), for which the insert (250) is abutting against the movable body (200), so that the low-stiffness spring (240) is fully compressed. FIG. 4C depicts a second intermediate situation of the movement travel of the movable body (200), for which the shock-absorbing block (220) is flush with the recess (236) of the wall (235) of the tubular sleeve (230), the last portion of the travel being accompanied by the compression of the shock-absorbing block (220) and thus by the progressive dissipation of the kinetic energy of the movable body (200). FIG. 4C shows the operative, or retracted, position of the actuating head (280), indicating the end of the movement travel of the movable body (200), the rigid abutment (256) is then in contact with the recess (236) of the wall (235) of the tubular sleeve (230). This embodiment differs from the embodiment shown in FIG. 3A in that the actuating head (280) is presented in the form of a finger secured to the movable body (200) by an advancing operation until it abuts against a shoulder (281), the shoulder also providing a bearing for the spring (240) by virtue of its opposite face (282). The actuating head (280) can thus be made of a material different from that of the movable body (200) so as to meet technical constraints or different needs depending on the application. For example, the actuating head can be made of a plastic material to improve the dissipation of the energy, during impacts, with respect to a ferromagnetic material such as that used for the movable body. Thus, the opposite face (282) of the actuating head (280) can have an axial bump expanding within the low-stiffness spring (240) to ensure that the insert (250) abuts with the second cylindrical extension (258).

This embodiment also differs from the preceding embodiment shown in FIGS. 3A-3C in that the shock-absorbing block (220) has a through-hole for its placement on the axial stud (255), of the insert (250). Since the length of the axial stud (255) is slightly less than that of the shock-absorbing block (220), but long enough so that, following the compression of the shock-absorbing portion, the retracted position obtained at the end-of-travel is the result of placing the end of the axial stud (255), forming a rigid abutment (256), in contact against the wall (235) of the tubular sleeve (230), so that a clearance remains between the wall (235) and the movable body (200). Thus, the material of the insert (250) can be selected to meet specific constraints of the specifications, when the abutment by the movable body (200) made of ferromagnetic material is not satisfactory. For example, the insert (250) can be made of plastic material to improve the dissipation of the energy during the abutment in the retracted position, and thus improve the acoustic and vibratory behavior of the actuator.

Fifth Variant Embodiment

Figure 5:
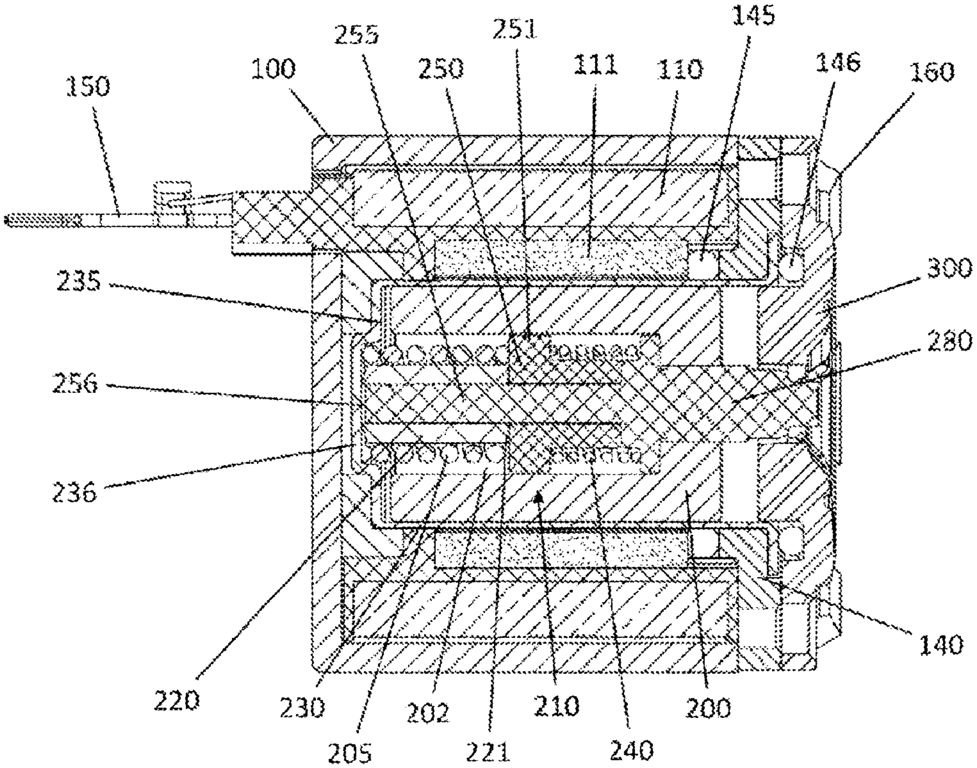
FIG. 5 depicts a cross-sectional view of a fifth variant embodiment of an actuator according to the present disclosure.

FIG. 5 depicts a fifth variant embodiment of a linear actuator according to the present disclosure. This embodiment is similar to that shown in FIGS. 4A-4D, FIG. 5 corresponding to the situation shown in FIG. 4C, or a situation in which the shock-absorbing block (220) is flush with the recess (236) of the tubular sleeve (230). This embodiment nevertheless differs from that presented previously in that the axial stud (255) supporting the shock-absorbing block (220) is an extension of the actuating head (280). The insert (250) is then provided with a through-hole allowing it to be guided axially by the axial stud (255) passing through it. The shock-absorbing block (220) and the insert (250) are then mounted with clearance on the axial stud (255) to allow the release of the spring (205) at the end of the movement travel.

Force-Movement Profile

Figure 6:
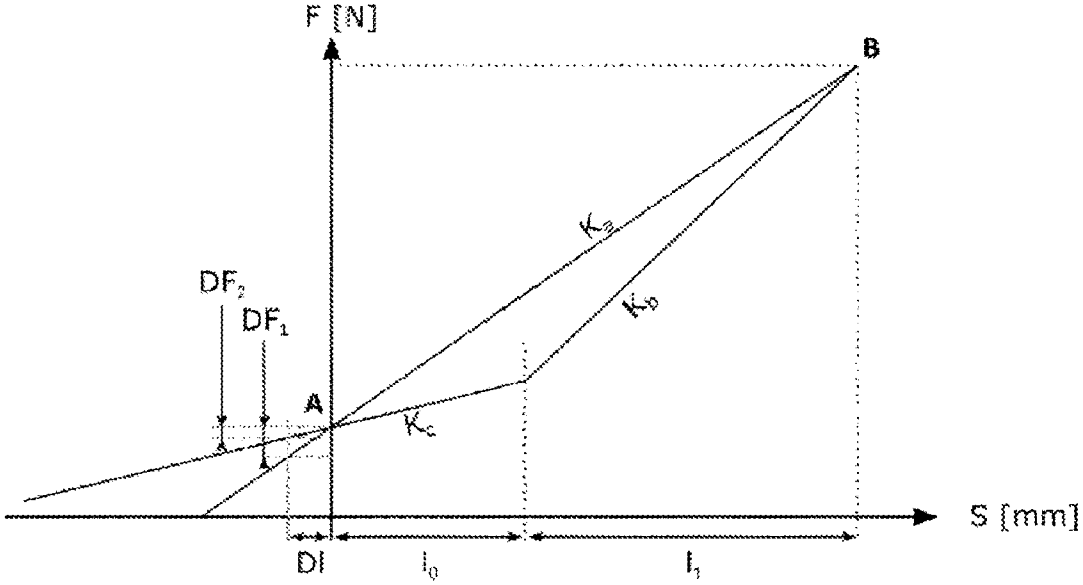
FIG. 6 depicts the force/position curve for two variant embodiments of an actuator according to the present disclosure one being that presented in FIG. 2 and the other being one of those presented in FIG. 3A-3C, 4A-4D, or 5.

FIG. 6 shows the variation of the force F exerted by the resilient return means along the travel S, and does so in a variant with one spring, shown in FIG. 2, or with two springs in series as shown in FIGS. 3A, 4A, and 5. FIG. 6 shows two working points defined by the specifications, point A representing the force necessary to ensure the sealing of the valve when the movable body is in the inoperative position and point B representing the force necessary to ensure the movement of the movable body, from the operative position to the inoperative position, when the powering of the coil is interrupted, and to do so with the required dynamics. It should be noted that the very short travel ($l_2-l_1$) over which the shock-absorbing block expands has not been shown. Strictly speaking, additional force variations can be observed around point B.

In the variant of FIG. 2, a single spring, of stiffness $K_a$, can be used to obtain the required forces at points A and B separated from the total travel $l_0+_1$.

In the variant of FIG. 3A, the first spring (205), with high stiffness $K_b$, aims to achieve the force required at point B, to move the movable body over the travel $l_1$ with the required speed. The second spring (240), of lower stiffness $K_c$, ensures the movement of the movable body over the second portion of the travel $l_0$, and is dimensioned so as to obtain the force required at point A.

This second variant makes it possible to maintain standard length tolerances for manufacturing springs in order to reduce costs. Indeed, a clearance of ±Δl may result from manufacturing dispersions, which will result in a force variation in the position wherein the resilient return means is released, or at point A. A positive force variation will involve an overstress on the valve, which may lead to its deterioration, whereas a negative force variation may lead to a sealing defect. This force variation is directly proportional to the clearance ±Δl and to the stiffness of the resilient return means. Thus, in the variant with one spring, a force variation $\pm\Delta F_1=\pm\Delta l\times K_a$ is obtained, while in the variant with two springs, the force variation is determined by the low-stiffness spring ensuring the second portion of the travel, i.e., $\pm\Delta F_2=\pm\Delta l\times K_c$. By virtue of the judicious use of two springs of different stiffnesses, a force variation $\Delta F_2<\Delta F_1$ is obtained to preserve the performance of the valve while being compatible with the dispersions conventionally obtained in mass productions.

Rotary Version

Even if it is not shown, the principle can be transferred quite easily to a rotary version of the actuator by a person skilled in the art. It is possible, for example, to adapt the teachings of patent EP1897211, describing a single-phase electromagnetic servo-actuator made up of a rotary actuator intended to move a movable member over a limited travel. The described actuator therefore contains the electrical coil intended to move the rotor, or the movable body to which the element to be rotationally actuated is connected by means of its pin, also referred to herein as the actuating head. It is then conceivable for a person skilled in the art to follow the teachings described hereinbefore to integrate the resilient return means and the shock-absorbing block mechanically connected to the latter. The extreme positions are then angular positions and the shock-absorbing block can have a tubular shape and can be arranged tangentially to the rotor in order to compress axially against a tangential abutment, when the movable member arrives in the second extreme position. The resilient return means, preferentially being a spiral spring, which can be mechanically connected to the abutment at a first end and to the movable body, its second end being mechanically connected to the shock-absorbing block, directly or via the movable body.

The possibility disclosed in the preceding paragraph is not limiting and a person skilled in the art could find other arrangements for a rotary actuator following the teachings described.

The invention claimed is:

1. A direct drive electromagnetic actuator, comprising:

an outer housing;

a movable body disposed at least partially within the outer housing, the movable body extended by an actuating head, the actuator configured to control movement of the movable body between an inoperative position and an operative position, the movable body comprising a ferromagnetic material;

a resilient return member disposed within the outer housing and configured to exert a first force on the movable body in a first direction extending toward the inoperative position;

a fixed coil located and configured to interact with the ferromagnetic material of the movable body so as to generate a second force acting on the movable body in a second direction opposite to the first direction, the second direction extending toward the operative position;

a shock-absorbing block movable with respect to the outer housing over at least a portion of the travel of the movable body between the inoperative position and the operative position, the shock-absorbing block being joined to the resilient return member, a length of the shock-absorbing block being such that the shock-absorbing block is compressed when the movable body is in the operative position; and a rigid abutment movable over at least a portion of the travel of the movable body between the inoperative position and the operative position, the rigid abutment coming into contact with a wall secured to the housing when the movable body is in the operative position.

2. The actuator of claim 1, wherein the resilient return member consists of two adjacent springs separated by an insert forming a bearing for the shock-absorbing block.

3. The actuator of claim 2, wherein the two adjacent springs are arranged in a cylindrical recess of the movable body having an inner section larger than the section of the springs in the released state and wherein the insert has a shoulder for guiding at least one of the two adjacent springs, the shock-absorbing block bearing against the shoulder.

4. The actuator of claim 2, wherein the shock-absorbing block is disposed on an axial stud including the rigid abutment, the axial stud being movable over at least a portion of the travel of the movable body between the inoperative position and the operative position.

5. The actuator of claim 4, wherein the shock-absorbing block has a through hole, the operative position being obtained by placing the rigid abutment of the axial stud in contact against the wall.

6. The actuator of claim 4, wherein the axial stud is an extension of the insert.

7. The actuator of claim 4, wherein the actuating head and the movable body are separately formed parts secured to one another.

8. The actuator of claim 7, wherein the axial stud is an extension of the actuating head.

9. The actuator of claim 7, wherein the actuating head comprises plastic material.

10. The actuator of claim 2, wherein a stiffness of the one of the two adjacent springs closest to the actuating head is less than a stiffness of the other of the two adjacent springs.

11. The actuator of claim 1, wherein the rigid abutment is an end of the movable body facing the wall.

12. The actuator of claim 11, wherein the movable body moves within the coil.

13. The actuator of claim 1, wherein the shock-absorbing block comprises a shock-absorbing spring having stiffness greater than a stiffness of the resilient return member, the shock-absorbing block being disposed in a tubular sleeve having a connected end bearing against an end of the resilient return member closest to the actuating head, the shock-absorbing spring being compressed between the wall of the tubular sleeve and a shoulder of a cylindrical recess of the movable body when the movable body is in the operative position.

14. The actuator of claim 1, wherein the movable body translates.

15. The actuator of claim 1, wherein the movable body rotates.

16. The actuator of claim 1, further comprising an annular magnet disposed between the fixed coil and the movable body.

* * * * *